(12) United States Patent
Han et al.

(10) Patent No.: US 11,471,926 B2
(45) Date of Patent: Oct. 18, 2022

(54) ELECTROMAGNETIC MANUFACTURING METHOD AND FORMING DEVICE OF MESOSCALE PLATE

(71) Applicant: HUAZHONG UNIVERSITY OF SCIENCE AND TECHNOLOGY, Hubei (CN)

(72) Inventors: Xiaotao Han, Hubei (CN); Zelin Wu, Hubei (CN); Qi Chen, Hubei (CN); Quanliang Cao, Hubei (CN); Liang Li, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 17/283,956

(22) PCT Filed: Jun. 13, 2020

(86) PCT No.: PCT/CN2020/095991
§ 371 (c)(1),
(2) Date: Apr. 9, 2021

(87) PCT Pub. No.: WO2021/232518
PCT Pub. Date: Nov. 25, 2021

(65) Prior Publication Data
US 2022/0048091 A1  Feb. 17, 2022

(30) Foreign Application Priority Data

May 18, 2020 (CN) .......................... 202010417313.2

(51) Int. Cl.
*B21D 26/14* (2006.01)
*B21D 43/00* (2006.01)
(Continued)

(52) U.S. Cl.
CPC ........... *B21D 26/14* (2013.01); *B21D 43/003* (2013.01); *H01M 8/0208* (2013.01); *H01M 8/0258* (2013.01); *H01M 2008/1095* (2013.01)

(58) Field of Classification Search
CPC ... B21D 26/14; B21D 43/003; H01M 8/0208; H01M 2008/1095; H01M 8/0258
(Continued)

(56) References Cited

U.S. PATENT DOCUMENTS 3,175,383 A * 3/1965 Levine .................. B21D 26/14
264/DIG. 45
3,365,522 A * 1/1968 Inoue ..................... B21D 26/14
264/450
(Continued)

FOREIGN PATENT DOCUMENTS

CN 1284901 2/2001

OTHER PUBLICATIONS

SI Units—Temperature, NIST.pdf (https://www.nist.gov/pml/weights-and-measures/si-units-temperature.htm) (Year: 2022).*
(Continued)

*Primary Examiner* — Adam J Eiseman
*Assistant Examiner* — Fred C Hammers
(74) *Attorney, Agent, or Firm* — JCIP Global Inc.

(57) ABSTRACT

Electromagnetic manufacturing method and forming device of mesoscale plate are provided. The manufacturing method includes: oppositely and parallelly disposing a first workpiece to be formed on top of a mold, side-press restraining two ends of the first workpiece, and disposing a deceleration block on two sides of the mold; controlling the first workpiece to tend toward the mold and to be deformed under the drive of uniform electromagnetic force; and colliding a middle area of the first workpiece firstly with the mold under the drive of uniform electromagnetic force, and driving the (Continued)

speed of the middle area of the first workpiece to decelerate to zero. When an area close to the two ends collides with the deceleration block and until the speed of all areas of first workpiece decelerates to zero, forming is completed. Shaping is tending further toward the mold through electromagnetic force until completely fitted to the mold.

15 Claims, 5 Drawing Sheets

(51) Int. Cl.
  *H01M 8/0208* (2016.01)
  *H01M 8/0258* (2016.01)
  *H01M 8/10* (2016.01)

(58) Field of Classification Search
  USPC .............................. 72/56, 54, 707; 29/419.2
  See application file for complete search history.

(56) References Cited

U.S. PATENT DOCUMENTS

| | | | | |
|---|---|---|---|---|
| 3,372,566 A | * | 3/1968 | Schenk | B21D 26/14 72/56 |
| 3,618,350 A | * | 11/1971 | Larrimer | B21D 26/14 72/6.1 |
| 4,619,127 A | * | 10/1986 | Sano | B21D 26/14 29/419.2 |
| 5,860,306 A | * | 1/1999 | Daehn | B21D 26/14 72/707 |
| 6,085,562 A | * | 7/2000 | Daehn | B21D 26/14 72/430 |
| 6,564,605 B1 | * | 5/2003 | Gafri | B21D 26/14 72/55 |
| 2003/0035991 A1 | * | 2/2003 | Colombo | C08G 83/003 521/27 |

OTHER PUBLICATIONS

"International Search Report (Form PCT/ISA/210) of PCT/CN2020/095991," dated Jan. 27, 2021, pp. 1-5.

* cited by examiner

ELECTROMAGNETIC MANUFACTURING METHOD AND FORMING DEVICE OF MESOSCALE PLATE

CROSS-REFERENCE TO RELATED APPLICATION

This application is a 371 of international application of PCT application serial no. PCT/CN2020/095991, filed on Jun. 13, 2020, which claims the priority benefit of China application no. 202010417313.2, filed on May 18, 2020. The entirety of each of the above mentioned patent applications is hereby incorporated by reference herein and made a part of this specification.

BACKGROUND

Technical Field

The disclosure relates to the field of material forming and manufacturing, and more specifically to an electromagnetic manufacturing method and a forming device of a mesoscale plate.

Description of Related Art

The proton exchange membrane fuel cell has the advantages of high efficiency, low working temperature, fast start-up, nearly zero pollution, etc. In recent years, the proton exchange membrane fuel cell has received extensive attention and has been widely applied to automobiles, long-distance transportation trucks, and even drones. As a key component of the proton exchange membrane fuel cell, a bipolar plate mainly includes a graphite bipolar plate, a polymer-carbon composite bipolar plate, and a metal bipolar plate, which account for about 75% of the total cell weight and about 11% to 45% of the total cost. The metal bipolar plate has the advantages of superior manufacturing performance, high mechanical strength, low cost, etc., and has become the future development trend. Especially for titanium alloy and stainless steel with low thickness (0.05 mm to 0.2 mm), which still have sufficient mechanical strength under the mesoscale.

The metal bipolar plate usually requires dense and deep (about 0.4 mm in depth and about 1 mm in width) microflow channels to better transfer and exchange substances, and requires extremely high flatness and surface precision in order to form a stack of hundreds of bipolar plates (flatness deviation ±1%). The traditional stamping and forming requires multiple molds and multiple procedures to obtain a bipolar plate that satisfies quality requirements, which causes the processing process to be difficult and complicated, and costs to increase. Therefore, exploring a new low-cost forming process of the bipolar plate is urgent and of great significance.

Electromagnetic forming is a high-speed forming method that uses an electromagnetic force to accelerate a workpiece from static to hundreds of meters per second within hundreds of microseconds to collide with a mold, which may increase the forming limit of metals and is an important technical solution for solving the forming and manufacturing issues of metals, such as stainless steel and titanium alloys, that are difficult to process while greatly reducing processing procedures and reducing costs. However, how to control the electromagnetic forming process of the bipolar plate is the key to obtain the high-precision and high-flatness bipolar plate.

Figure 1:
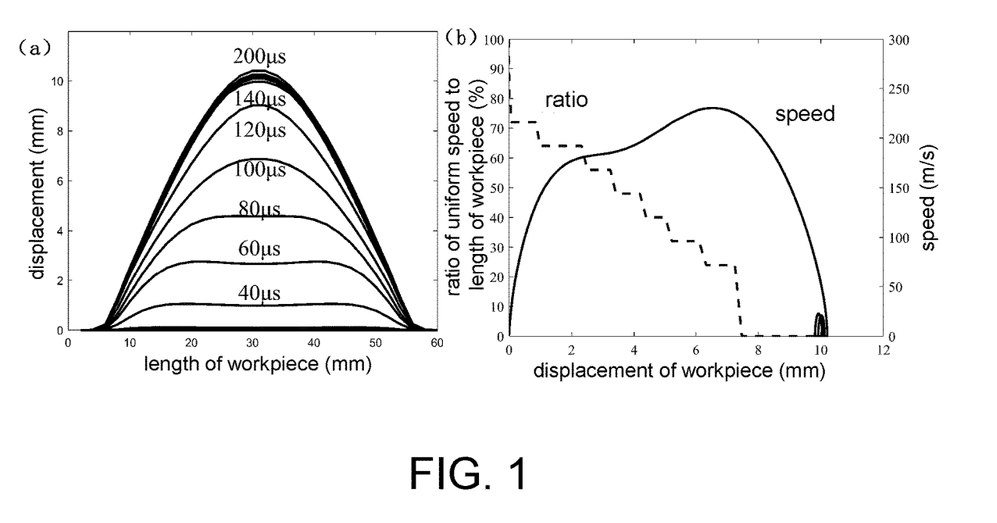
FIG. 1 is a deformation diagram of a workpiece under a uniform electromagnetic force, wherein (a) of FIG. 1 is a diagram of a deformation process and displacement distribution of the workpiece with time; and (b) of FIG. 1 is a diagram of a ratio of a uniform speed interval of the workpiece to a length of the workpiece under different forming displacements and speed under different forming displacements.

The existing forming process has the following issues:

(1) The workpiece cannot obtain a uniform and sufficiently high speed in order to obtain a uniform impact force before colliding with the mold. FIG. 1 shows speed and displacement distribution diagrams of a workpiece in the prior art. It can be seen from FIG. 1 that even if the workpiece is subjected to a uniform electromagnetic force, due to the side-press restraining effect at two ends of the workpiece, the speed in a middle area of the workpiece during the forming process is uniform but the speed at the two ends is smaller, which causes the depths of flow channels at the two ends of the workpiece to be smaller.

(2) The rebound and wrinkles of the thin-walled workpiece during the colliding process cannot be avoided. During the forming process, the total length of the workpiece is increased due to plastic deformation, and if uncontrolled, the workpiece will form wrinkles and regional rebound, which seriously affect the flatness of the workpiece.

(3) The workpiece cannot be accurately shaped after preliminary forming. The relative change between the positions of the workpiece and the mold due to secondary tooling will cause a larger flow channel error. At the same time, without an acceleration distance, it is impossible to ensure that the workpiece obtains a sufficient impact force.

SUMMARY

In view of the defects of the prior art, the objective of the disclosure is to provide an electromagnetic manufacturing method of a mesoscale plate, which aims to solve the issues that a workpiece in the prior art cannot obtain a uniform impact force before colliding with a mold, and wrinkles and regional rebound generated during the forming process of the workpiece that cause poor flatness of the workpiece.

In order to achieve the above objective, the disclosure provides the electromagnetic manufacturing method of the mesoscale plate, which includes a forming step and a shaping step. The forming step specifically includes the following.

(1) A first workpiece to be formed is disposed opposite to a mold and is at a spacing from the mold. Two ends of the first workpiece are side-press restrained, a deceleration block is disposed on the two sides of the mold, and the height of the deceleration block is less than the height of the mold.

(2) The first workpiece is controlled to tend toward the mold under the drive of a uniform electromagnetic force and accelerate to be deformed.

(3) Under the drive of the uniform electromagnetic force, a middle area of the first workpiece first collides with the mold. An area close to the two ends of the first workpiece continue to move toward the direction of the mold, and the middle area of the first workpiece is driven to decelerate to zero. After the area close to the two ends of the first workpiece collides with the deceleration block and until the speed of all areas of the first workpiece decelerates to zero, forming is completed.

The shaping step specifically includes the following.

(4) The first workpiece is controlled to tend further toward the mold under the drive of the electromagnetic force, and proceed to Step (5).

(5) Whether the first workpiece completely fits the mold is determined. If yes, shaping is completed, and if not, return to Step (4).

Furthermore, through adjusting the spacing between the mold and the first workpiece, a uniform speed distribution area of the first workpiece completely covers a forming area of the mold at the moment of collision with the mold, and the size of the spacing is negatively related to the size of the uniform speed distribution area in the middle area of the first workpiece, and firstly increases and then decreases with the size of the collision speed.

Furthermore, the electromagnetic force on the first workpiece is generated by the combined action of a magnetic field and a workpiece current. The workpiece current enables the first workpiece to collide with the mold at a specific temperature when Joule heat is generated. According to the size of a temperature interval, the room temperature forming, warm forming, and superplastic forming of the first workpiece may be implemented.

Furthermore, a second workpiece to be formed is disposed below and in a middle position of the first workpiece and fits the first workpiece. The first workpiece is controlled to tend toward the mold under the drive of a uniform electromagnetic force and drives the second workpiece to collide with the mold. The topography of the second workpiece is restrained through the mold. The length of the second workpiece is less than the length of the first workpiece, and the second workpiece inherits the uniform speed middle area of the first workpiece.

Furthermore, through disposing a layer of soft insulating material between the first workpiece and the second workpiece, the second workpiece can better flow to the bottom of the mold.

The disclosure also provides a mesoscale plate obtained based on the manufacturing method.

The disclosure also provides a proton exchange membrane fuel cell based on the mesoscale plate.

The disclosure also provides an electromagnetic forming device of a mesoscale plate, which includes a coil frame, a forming coil, side-press device, a workpiece support block, a mold, a pulse supply, a first deceleration block, and a second deceleration block. The forming coil is wound onto the coil frame and is used to generate a uniform electromagnetic force after electrifying. The pulse supply is connected to the forming coil to provide power supply to the forming coil. The side-press device is used to provide a side-press force for the first workpiece to be formed. The workpiece support block is maintained in contact with the first workpiece to be formed under the external pressure provided by the side-press device and is disposed inside the coil frame. The first deceleration block and the second deceleration block are respectively disposed at two ends of the mold, and the heights of the first deceleration block and the second deceleration block are less than the height of the mold. The first deceleration block and the second deceleration block are used to provide a buffer to an area close to two ends of the first workpiece to decelerate after the first workpiece collides with the mold.

When working, the first workpiece to be formed is oppositely disposed on top of the mold. The two ends of the first workpiece are restrained through the side-press device. The first workpiece is controlled to tend toward the mold under the drive of a uniform electromagnetic force and to be deformed. Under the drive of the uniform electromagnetic force, a middle area of the first workpiece first collides with the mold. An area close to the two ends of the first workpiece continue to move toward the direction of the mold, and the middle area of the first workpiece is driven to decelerate to zero. After the area close to the two ends of the first workpiece collides with the deceleration block and until the speed of all areas of the first workpiece decelerates to zero, forming is completed. A lengthened portion of the first workpiece due to plastic deformation is restrained above the first deceleration block and the second deceleration block to ensure that a portion of the first workpiece in contact with the mold is flattened and completely fits the mold, which reduces the wrinkles and rebound of the workpiece, and improves the flatness of the workpiece. Furthermore, a second workpiece is also included. The second workpiece is fitted at a lower middle position of the first workpiece. The length of the second workpiece is less than the length of the first workpiece.

Furthermore, the side-press device provides pressure to the workpiece support block through acting on a portion of the workpiece support block greater than the width of the forming coil. The structure of the side-press device specifically includes the following. The side-pressing of the first workpiece is implemented by adopting a shank connected and fixed to the portion of the workpiece support block greater than the width of the forming coil and then tightly pressed with an outer wall of the coil frame through a nut. Alternatively, the side-pressing of the first workpiece is implemented through a short-stroke cylinder or a similar mechanical structure directly acting on the portion of the workpiece support block greater than the width of the forming coil by applying pressure to tend toward an inner wall of the coil frame.

Furthermore, the forming coil is a multi-turn spiral coil wound by a single wire, which is convenient to manufacture and reliable; or is multiple multi-turn spiral coils wound in parallel by multiple wires. Two ends of the multiple wires adopt tightly pressed connectors to maintain electrical contact. Such parallel winding may significantly reduce the impedance of the coil and increase the current frequency of the coil, so that the workpiece obtains a higher electromagnetic force.

Further, the width of the workpiece support block is greater than the width of the forming coil. The workpiece support block is a conductor, preferably a good conductor such as copper, aluminum, etc. The workpiece support block and the first workpiece maintain good electrical contact. Therefore, the first workpiece and the workpiece support block will both induce current and form a current loop, which may significantly improve the uniformity of the induced current flowing through the first workpiece and the uniformity of the electromagnetic force. At the same time, the electromagnetic force between the first workpiece and the workpiece support block enables the two to press against each other, which may also provide the electromagnetic side-press force for the first workpiece. The workpiece support block may also be an insulator. At this time, the workpiece support block will not induce current, and the first workpiece will not cause an electric arc issue due to the electrical contact.

Furthermore, pressure is applied to the workpiece support block to drive the first workpiece to tend toward the inner wall of the coil frame.

Furthermore, the shape of the mold is designed according to the required topography of the first workpiece, which specifically has an arbitrary curved surface shape, such as a wavy, concave, or convex shape, to restrain the shape of the workpiece; or is an arbitrarily shaped concave or convex groove to implement plate blanking. Blanking and forming may be simultaneously completed during one forming process.

Furthermore, the mold and the first deceleration block and the second deceleration block disposed at the two ends thereof may be integrally formed as a whole to constitute the mold. An area of the two ends of the mold is less than the height of the forming area of the mold.

Through the above technical solutions conceived by the disclosure, compared with the prior art, the disclosure can achieve the following beneficial effects:

(1) In the disclosure, the workpiece may obtain a uniform and sufficiently high speed before colliding with the mold. A uniform speed distribution implies a uniform impact pressure, which may avoid thinning and cracking caused by larger depth deviation of the flow channel and excessive local stress of the workpiece. Also, increasing the size of the speed enables the workpiece obtain a higher impact force, that is, a deeper flow channel.

(2) The disclosure may reduce the rebound and wrinkles of the thin-walled workpiece during the colliding process. Specifically, through setting the height of the deceleration block to be less than the height of the mold, the lengthened portion of the workpiece due to plastic deformation that is close to the two ends of the mold may continue to move downward, thereby reducing the wrinkles and rebound of the workpiece, and improving the flatness of the workpiece.

(3) In the disclosure, the workpiece may be accurately shaped after preliminary forming. Specifically, through the integral movement of the mold and the second workpiece and the first workpiece fitted thereto, the mold is fitted to the inner wall of the coil frame under external pressure to control the discharge of the forming coil. The electromagnetic force is generated in the second workpiece and the first workpiece to further tend toward the mold, so as to complete the shaping of the workpiece, which may avoid positional offset of the flow channel caused by secondary tooling.

(4) The disclosure solves the issue of side-pressing the workpiece in a narrow space through applying pressure to the workpiece support block to tend toward the inner wall of the coil frame.

(5) In the disclosure, through setting the length of the second workpiece to be less than the length of the first workpiece, the uniform and high speed of the middle area of the workpiece is inherited, which reduces the deviation of the flow channel of the workpiece.

(6) In the disclosure, the forming coil that satisfies forming requirements of the bipolar plate is very important, which may not only provide a uniform electromagnetic force for the workpiece, but also provide a sufficient electromagnetic side-press force for the workpiece, and ensure that coils have sufficient lifespan and forming efficiency in mass production.

DETAILED DESCRIPTION OF DISCLOSED EMBODIMENTS

For the objective, technical solutions, and advantages of the disclosure to be clearer, the disclosure is further described in detail below with reference to the accompanying drawings and the embodiments. It should be understood that the specific embodiments described here are only used to explain the disclosure, but not to limit the disclosure.

The disclosure may satisfy the requirements of obtaining uniform and sufficiently high speed for a mesoscale device, such as a metal bipolar plate, and the goal of reducing rebound and wrinkles, and improving surface quality. The disclosure provides an electromagnetic manufacturing method and a forming device of a mesoscale plate. For ease of description, only parts related to the embodiments of the disclosure are shown, which are described in detail below with reference to the drawings.

Figure 2:
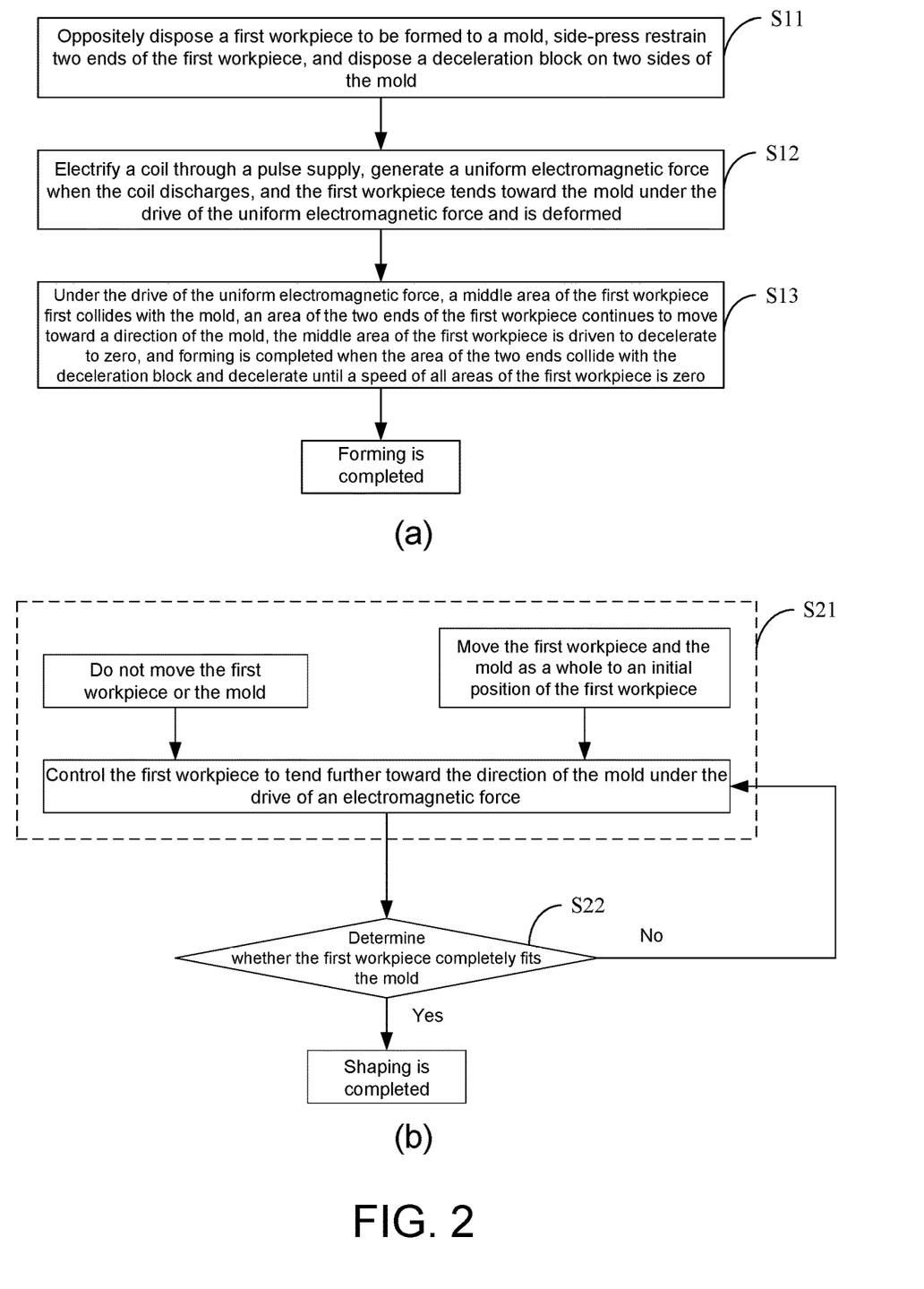
FIG. 2 is an implementation flowchart of an electromagnetic manufacturing method of a mesoscale plate according to an embodiment of the disclosure, wherein (a) of FIG. 2 is a flowchart of a forming step in the electromagnetic manufacturing method of the mesoscale plate; and (b) of FIG. 2 is a flowchart of a shaping step in the electromagnetic manufacturing method of the mesoscale plate.

As shown in FIG. 2, the electromagnetic manufacturing method for mesoscale plates provided by the disclosure includes two steps: a workpiece forming step S1 and a workpiece shaping step S2.

As shown in (a) of FIG. 2, the workpiece forming step S1 includes the following.

S11: A first workpiece to be formed is oppositely and parallelly disposed to a mold. Two ends of the first workpiece are side-press restrained. A deceleration block is disposed on two sides of the mold. The height of the deceleration block is less than the height of the mold.

S12: A coil is energized through a pulse supply. A uniform electromagnetic force is generated in the first workpiece when the coil is discharged. The first workpiece tends toward the mold and is deformed under the drive of the uniform electromagnetic force.

S13: Under the drive of the uniform electromagnetic force, a middle area of the first workpiece first collides with the mold. An area of two ends of the first workpiece continue to move toward the direction of the mold, and drives the middle area of the first workpiece to decelerate to zero. After an area close to the two ends of the first workpiece collides with the deceleration block and until the speed of all areas of the first workpiece decelerates to zero, forming is completed.

In an embodiment of the disclosure, since a uniform speed distribution area in the middle area of the first workpiece first collides with the mold, the size of the uniform speed distribution area of the first workpiece and the size of the speed of the corresponding workpiece at the moment of collision with the mold may be implemented through adjusting a spacing between the mold and the first workpiece. As shown in (b) of FIG. 1, as the spacing decreases, the size of the uniform speed middle area of the first workpiece gradually increases, and the collision speed first increases and then decreases as the spacing increases. The size of the spacing may be reasonably designed through finite element and other methods so that the uniform speed middle area of the workpiece completely covers a mold area and collides with the mold at a speed of generally greater than 50 m/s to restrain the shape of the workpiece.

Since the area close to the two ends of the first workpiece still moves downward after the middle area of the first workpiece collides with the mold, the first workpiece decelerates after colliding with the deceleration block until the speed of all areas of the first workpiece is zero. During the process, the height difference between the deceleration block and the mold should be reasonably designed to match the length of the workpiece after plastic deformation, that is, a lengthened portion of the workpiece due to plastic deformation should be restrained above the deceleration block, so as to ensure that a portion of the workpiece in contact with the mold is flattened and completely fits the mold, which greatly improves and reduces the wrinkles and rebound of the workpiece.

In the embodiment of the disclosure, the workpiece forming step further includes: fitting the second workpiece and the first workpiece, driving the second workpiece through the first workpiece and enabling the second workpiece to collide with the mold, and restraining the topography of the second workpiece through the mold.

The length of the second workpiece is shorter than the length of the first workpiece but greater than or equal to the length of the mold. During the forming process, the second workpiece fits the first workpiece and is located in the middle area of the first workpiece, so that the second workpiece inherits the uniform speed distribution area of the first workpiece.

As an embodiment of the disclosure, a layer of soft insulating material (such as polyurethane) may be disposed between the first workpiece and the second workpiece, so that the second workpiece may better flow toward the bottom of the mold. In the embodiment of the disclosure, when it is necessary to form a low-conductivity metal such as a titanium alloy, since the current induced by titanium itself is too small to generate a sufficient electromagnetic force to satisfy its own plastic deformation, an aluminum plate may be adopted as the first workpiece and a titanium plate as the second workpiece.

In the disclosure, the shaping is the leveling of the workpiece and the reshaping of a spatial shape process member. The workpiece is slightly deformed in advance through an electromagnetic force, and the flatness, shape, size, fillet radius, etc. of a stamping member are trimmed to satisfy procedures required by the first workpiece or the second workpiece. Compared with the traditional contact force shaping, the electromagnetic force provided in the shaping method of the disclosure has no size effect and has an atomic-scale acting force on the workpiece, which may implement micron or even nanoscale topographical changes of the surface of the workpiece.

As shown in (b) of FIG. 2, the workpiece shaping step S2 includes the following.

S21: According to the topography of the formed workpiece and the mold to further shape difference in deformation amount, one or more types of the following shaping ways may be selected. (1) The workpiece or the mold is not moved, and an electromagnetic force is directly generated through an electromagnetic driver on the first workpiece to tend further toward the mold, which is suitable for the case of small amount of shaping. (2) The first workpiece covering the mold and the mold are moved to an initial position of the first workpiece, and the electromagnetic force is generated on the first workpiece through the electromagnetic driver to tend further toward the mold, so that the distance between the workpiece and the electromagnetic driver is reduced such that the electromagnetic force on the workpiece is increased, thereby improving the forming efficiency.

As an embodiment of the disclosure, the electromagnetic driver may be repeatedly discharged multiple times to ensure that the first workpiece completely fits the mold.

As an embodiment of the disclosure, a layer of soft film is arranged between the first workpiece and the forming coil to restrain the rebound of the first workpiece.

S22: The second workpiece is driven to move together through the first workpiece, so that the second workpiece acts on the mold to complete shaping.

The length of the second workpiece is shorter than the length of the first workpiece but greater than or equal to the length of the mold. During the shaping process, the second workpiece fits the first workpiece and is located in the middle area of the first workpiece.

In an embodiment of the disclosure, the first workpiece is a conductive material. The conductive workpiece may induce current in a changing magnetic field. The electromagnetic force of the first workpiece is generated by the combined action of the induced current generated by the electromagnetic driver on the workpiece and the surrounding magnetic field. The induced current may increase the temperature rise of the workpiece to improve the plasticity of the workpiece. The thinner the first workpiece, the more obvious the temperature rise of the first workpiece.

The forming process and the shaping process of the first workpiece may be performed in a vacuum environment to reduce the resistance of air on the workpiece, so that the workpiece may obtain a greater speed while reducing partial instability of the workpiece caused by air in the flow channel not being discharged in time, so as to improve surface precision of the workpiece.

Figure 3:
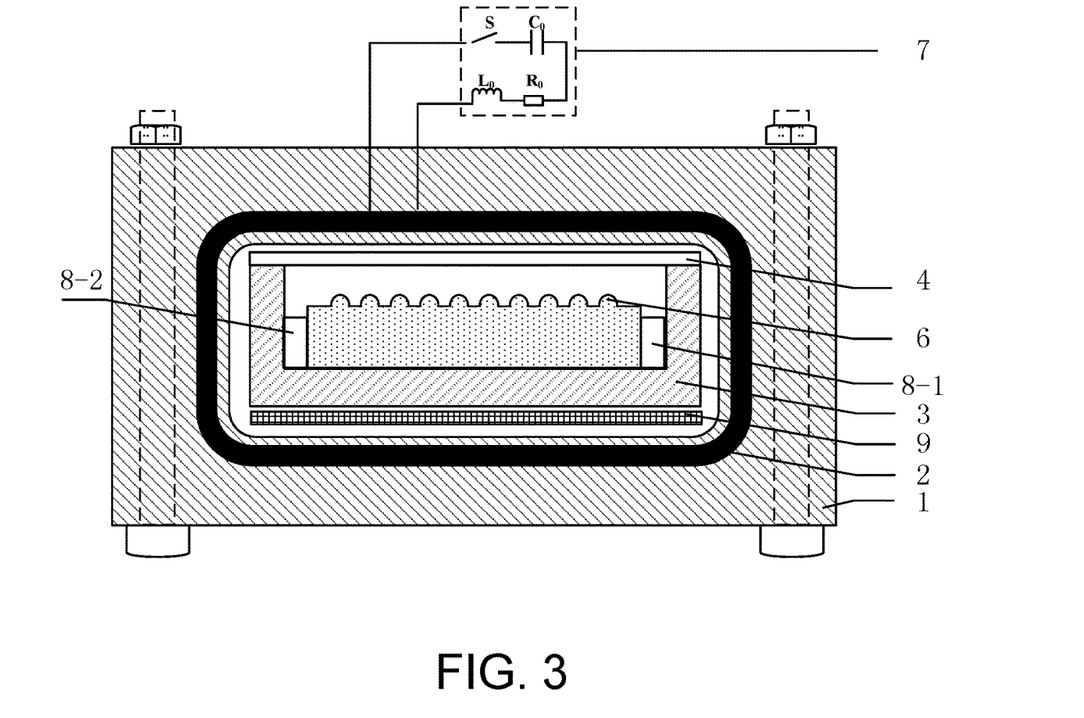
FIG. 3 is a schematic structural diagram of a forming device of a mesoscale plate according to a first embodiment of the disclosure.

As shown in FIG. 3, the disclosure also provides an electromagnetic forming device of a mesoscale plate, which includes: a coil frame 1, a forming coil 2, a side-press device 9, a workpiece support block 3, a mold 6, a pulse supply 7, a first deceleration block 8-1, and a second deceleration block 8-2. The forming coil 2 is wound onto the coil frame 1 and is used to generate a uniform electromagnetic force after electrifying. The workpiece support block 3 is maintained in contact with the first workpiece 4 under the external pressure provided by the side-press device 9 and is disposed inside the coil frame 1. The side-press device 9 is used to drive the workpiece support block 3 closer to the first workpiece 4 through acting on the workpiece support block 3, so as to provide a side-press force for the first workpiece 4. The pulse supply 7 is connected to the forming coil 2 to provide varying pulse current to the forming coil 2. The mold 6 is oppositely and parallelly disposed below the first workpiece 4. The mold 6, the first deceleration block, and the second deceleration block are all disposed inside the forming coil 2. The pulse supply 7 is connected to the forming coil 2 and is controlled to discharge the forming coil 2, so as to generate a forming and changing magnetic field inside the forming coil 2, so that an induced current is generated in the first workpiece. Under the combined action of the induced current and the forming magnetic field, the first workpiece is formed by strain caused by the electromagnetic force and tends toward the mold. The first deceleration block 8-1 and the second deceleration block 8-2 are respectively disposed at two ends of the mold 6, and the heights of the first deceleration block 8-1 and the second deceleration block 8-2 are less than the height of the mold 6. The first deceleration block 8-1 and the second deceleration block 8-2 are used to provide a buffer to decelerate after the first workpiece 4 collides with the mold.

When working, two ends of the first workpiece 4 are side-press restrained through the side-press device. The forming coil 2 is connected through the pulse supply 7. The pulse supply is controlled to discharge the forming coil 2 to generate a forming and changing magnetic field inside the forming coil 2. An induced current is generated in the first workpiece. Under the combined action of the induced current and the forming magnetic field, the first workpiece is formed by strain caused by the electromagnetic force and accelerates tending toward the mold. When the workpiece support block 3 is metal, the workpiece support block 3 will also generate an induced current and form a loop with the current in the first workpiece. A uniform speed distribution area in a middle area of the first workpiece first collides with the mold. Since the two ends of the first workpiece still move downward after the first workpiece collides with the mold, the first workpiece decelerates after colliding with the deceleration block until the speed of all areas of the first workpiece is zero. The size of the uniform speed distribution area of the first workpiece and the size of the speed of the corresponding workpiece at the moment of collision with the mold may be implemented through adjusting a spacing between the mold and the first workpiece, that is, the size of the spacing is negatively related to the uniform speed distribution area of the first workpiece. The size of the spacing may be reasonably designed through finite element and other methods so that the uniform speed middle area of the workpiece completely covers a mold area and collides with the mold at a speed of generally greater than 50 m/s to restrain the shape of the workpiece. During the process, the height difference between the deceleration block and the mold should be reasonably designed to match the length of the workpiece after plastic deformation, that is, a lengthened portion of the workpiece due to plastic deformation should be restrained above the deceleration block, so as to ensure that a portion of the workpiece in contact with the mold is flattened and completely fits the mold, which greatly improves and reduces the wrinkles and rebound of the workpiece.

As an embodiment of the disclosure, the forming coil 2 may be a multi-turn spiral coil wound by a single wire, which is convenient to manufacture and reliable; or may be multiple multi-turn spiral coils wound in parallel by multiple wires. Two ends of the multiple wires adopt tightly pressed connectors to maintain electrical contact and implement parallel connection. Such parallel winding may significantly reduce the impedance of the coil and increase the discharge current frequency of the coil, so that the workpiece obtains a higher electromagnetic force. The shape of the forming coil is preferably rectangular or racetrack, so that the workpiece obtains a uniform electromagnetic force.

As an embodiment of the disclosure, the workpiece support block 3 may be an insulator or a conductor while having a specific mechanical strength. When the workpiece support block 3 is a conductor, the workpiece support block 3 also maintains electrical contact with the first workpiece to induce current in the workpiece support block 3 and the first workpiece, so as to form an induced current loop, which enables the electromagnetic force obtained by the first workpiece to be more uniform.

As an embodiment of the disclosure, the deceleration block 8-1 and/or 8-2 may be an insulator or a conductor while having a specific mechanical strength. For example, epoxy or polyurethane is adopted to make a cuboid-like structure to be disposed on the two sides of the mold.

In an embodiment of the disclosure, the mold may be designed according to requirements and may have an arbitrary curved surface shape, such as a wavy, concave, or concave shape, to retrain the shape of the first workpiece; or may also be an arbitrarily shaped concave or convex groove to implement plate blanking. When the mold is integrally formed with the first deceleration block and the second deceleration block, the first deceleration block and the second deceleration block may be regarded as a portion of the mold, that is, the height of the two ends of the mold is less than the height of a middle portion. The two ends of the mold serve as a buffer to decelerate.

Figure 5:
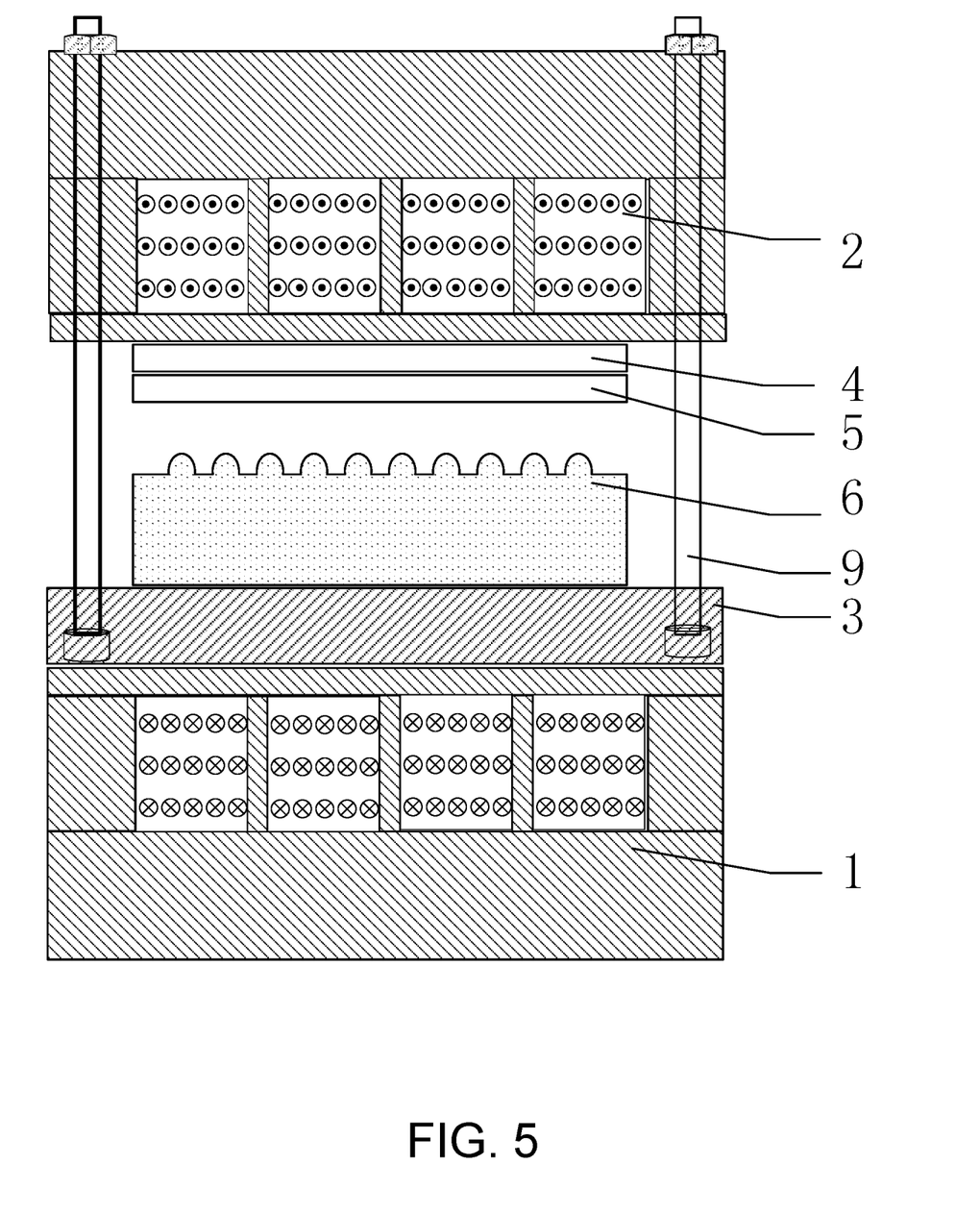
FIG. 5 is a schematic structural diagram of a longitudinal section of the forming device of the mesoscale plate according to an embodiment of the disclosure.

In an embodiment of the disclosure, the side-press device 9 applies external pressure to the workpiece support block, so as to drive the workpiece to tend toward an inner wall of the coil frame, thereby providing a side-press force for the first workpiece. As shown in FIG. 5, the workpiece support block should be greater than the width of the forming coil, and the side-press device contacts a portion of the workpiece support block greater than the width of the forming coil to apply pressure. The side-press device provides the side-press force for the first workpiece by adopting a shank connected and fixed to the workpiece support block and then tightly pressed with an outer wall of the coil frame through a nut. Alternatively, a short-stroke cylinder or a similar mechanical structure may directly act on the workpiece support block by applying pressure to tend toward an inner wall of the coil frame. Both ways overcome the issue of side-pressing the workpiece in a narrow space where the workpiece and the workpiece support block inside the coil fit the inner wall of the coil frame.

In an embodiment of the disclosure, the mold and the first workpiece are relatively and parallelly dispose with a spacing. The spacing allows the first workpiece to be accelerated under the action of the electromagnetic force, so as to obtain a collision speed. The spacing between the mold and the first workpiece may be reasonably designed through finite element and other methods, such that the uniform speed middle area of the workpiece completely covers the mold and collides with the mold to restrain the shape of the workpiece.

In an embodiment of the disclosure, the deceleration block is disposed on the two sides of the mold and is less than the height of the mold. In this way, an area close to the ends of the workpiece, that is, a portion excluding a side-press area of the first workpiece and a collision area between the first workpiece and the mold, continues to move downwards until the speed is zero, which may ensure that the portion of the workpiece in contact with the mold is flattened and completely fits the mold to further improve and reduce the wrinkles and rebound of the workpiece. The height difference between the deceleration block and the mold should be within a reasonable range to prevent the workpiece from snapping. The mold and the workpiece fitted thereto move as a whole to fit the inner wall of the coil frame, so as to control the pulse supply to perform secondary discharge on the forming coil. The electromagnetic force generated in the workpiece enables the workpiece to tend further toward the mold, so as to complete shaping of the workpiece.

Figure 4:
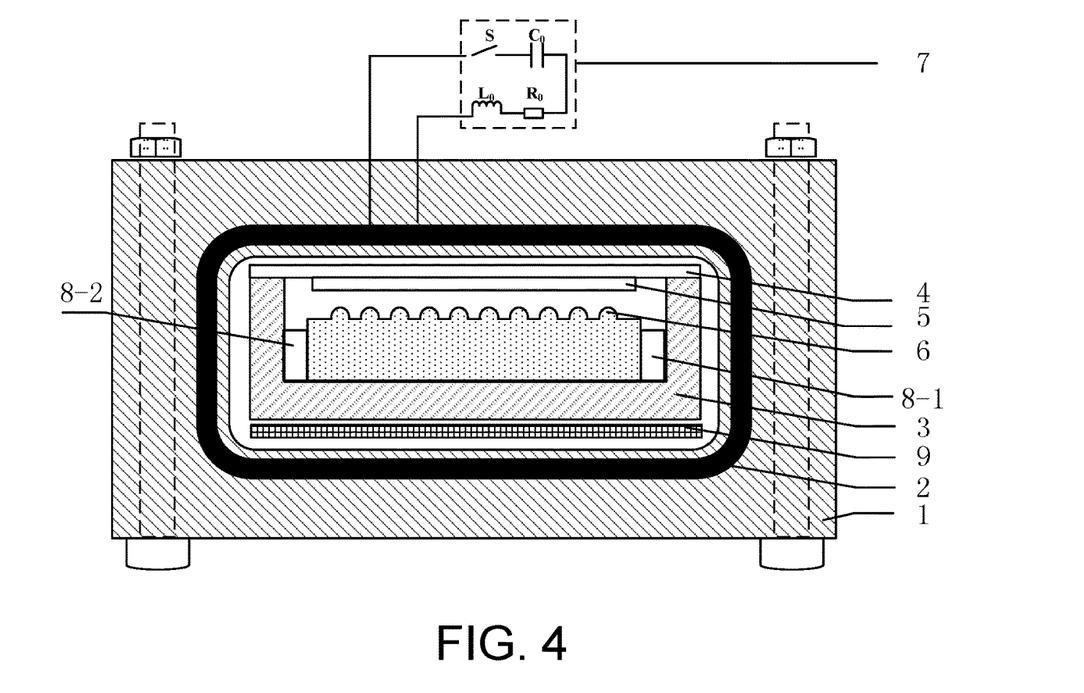
FIG. 4 is a schematic structural diagram of a forming device of a mesoscale plate according to a second embodiment of the disclosure.

In a second embodiment of the disclosure, when it is necessary to form a low-conductivity metal, such as a titanium alloy, since the current induced by titanium itself is too small to generate a sufficient electromagnetic force to satisfy its own plastic deformation, an aluminum plate may be adopted to drive the titanium plate to form. That is, the aluminum plate is the first workpiece and the titanium plate is a second workpiece. As shown in FIG. 4, on the basis of the forming device of the mesoscale plate, the second workpiece is also included. The second workpiece is fitted to the first workpiece, and the length of the second workpiece is shorter than the length of the first workpiece.

When the conductivity of the second workpiece is too low to induce sufficient current to obtain a sufficient electromagnetic force, the first workpiece may serve as a driving source to drive the second workpiece to move together, the length of the second workpiece is shorter than the first workpiece and is located at the center of the workpiece, which may avoid plastic deformation at two ends of the second workpiece due to side-press restraint, and may also help the second workpiece to inherit the uniform speed distribution area of the first workpiece.

More preferably, a layer of soft insulating material, such as polyurethane, may be disposed between the first workpiece and the second workpiece, so that the second workpiece can better flow to the bottom of the mold. At this time, the first workpiece preferably uses a high-conductivity alloy similar to aluminum or copper that is preferably a fully annealed industrial pure aluminum alloy, which has lower hardness and may facilitate the second workpiece to better flow to the bottom of the mold.

As an embodiment of the disclosure, the first workpiece may also be disposed outside the coil frame. The corresponding mold, workpiece support block, and deceleration block are located outside the forming coil.

In order to further illustrate the objective, technical solutions, and advantages of the disclosure, the following further describes the disclosure in detail with reference to FIG. 2 to FIG. 6 and the embodiments as follows.

A forming device of a mesoscale plate provided by the disclosure includes: a coil frame 1, a forming coil 2, a workpiece support block 3, a second workpiece 4, a first workpiece 4, a mold 6, a pulse supply 7, a first deceleration block 8-1, and a second deceleration block 8-2. The forming coil 2 is wound onto the coil frame 1, and a layer of reinforcement material similar to zylon or glass fiber is wound. The coil frame 1 is preferably cut from a high-strength insulating material, such as epoxy resin or zirconia ceramic. The workpiece support block 3 is a brass alloy H62 and is greater than the width of the forming coil, as shown in FIG. 5. The workpiece support block 3 and the first workpiece 4 maintain good contact under the action of a shank and the coil frame 1. The mold 6 is disposed inside a loop formed by the second workpiece 4 and the workpiece support block 3. The second workpiece 4 is tightly disposed in a middle area of the first workpiece 4 and faces the mold 6.

The first deceleration block 8-1 and the second deceleration block 8-2 are located at two ends of the mold 6. The forming coil 2 and the coil frame 1 constitute an electromagnetic driver. The pulse supply is used to provide current to the electromagnetic driver. The electromagnetic driver provides time-varying current to the forming coil through the pulse supply. The workpiece and the workpiece support block generate an induced current under the action of a changing magnetic field generated by the coil. The induced current forms a closed current loop through the workpiece support block and the workpiece. Under the action of the induced current, the workpiece generates a temperature rise, while under the combined action of the induced current and the magnetic field, the workpiece is also be subjected to a strong electromagnetic force.

The forming coil 2 in the electromagnetic driver may adopt a multi-turn multi-layer, multi-turn single-layer, single-turn multi-layer, single-turn single-layer spiral coil. The shape of the forming coil is preferably rectangular or racetrack for the workpiece to obtain a uniform electromagnetic force. The forming coil may be made by adopting winding of a conductive wire, cutting of a conductor as a whole, a bitter coil, or any combination of the above.

The forming coil 2 may be a multi-turn spiral coil wound by a single wire, which is convenient to manufacture and reliable; or may be multiple multi-turn spiral coils wound in parallel by multiple wires. Two ends of the multiple wires adopt tightly pressed connectors to maintain electrical contact. Such parallel winding may significantly reduce the impedance of the coil and increase the discharge current frequency, so that the workpiece obtains a higher electromagnetic force.

Since the outside of the forming coil 2 is not restricted, the inside of the coil frame 1 may be based on the heating condition of the coil. If the temperature rise of the coil is too high and the insulation is damaged, a water-cooling device may be selectively added to reduce the heating of the coil, thereby increasing the lifespan of the coil.

The workpiece support block 3 may be composed of a conductor, preferably a good conductor such as copper and aluminum. At the same time, the workpiece support block 3 should maintain good electrical contact with the first workpiece to provide a loop for the induced current, thereby significantly increasing the induced current flowing through the first workpiece.

The first workpiece 4 may be a metal material or any material plated with metal, that is, any material that may induce eddy currents in an alternating magnetic field.

The mold 6 may be designed according to the topography required by the first workpiece, which may have an arbitrary curved surface shape, such as a wavy, concave, or protruding shape, to restrain the shape of the workpiece; or may also be an arbitrarily shaped concave or convex groove to implement plate blanking.

The first deceleration block 8-1 and the second deceleration block 8-2 should be composed of materials with a specific strength with height less than the height of the mold, preferably materials such as epoxy blocks, which have high strength and are easy to process. The deceleration block is disposed on the two sides of the mold and should be less than the height of the mold. In this way, an area of the workpiece close to the two ends of the mold continue to move downward, thereby flattening the workpiece to improve the flatness of the workpiece and reduce rebound. The height difference between the deceleration block and the mold should be within a reasonable range to prevent the workpiece from snapping due to failure.

The side-press device applies external pressure to the workpiece support block, so that the workpiece support block is pressed to tend toward the inner wall of the coil frame, and finally implements the electrical contact between the workpiece support block and the workpiece, which also provides the side-press force for the workpiece. The way of providing the pressure on the workpiece support block by the side-press device may be implemented by adopting a shank to be connected and fixed to the workpiece support block and then tightly pressed with an outer wall of the coil frame through a nut. Alternatively, a short-stroke cylinder may directly act on the workpiece support block by applying pressure. Both ways overcome the issue of side-pressing the workpiece in a narrow space where the workpiece and the workpiece support block inside the coil fit the inner wall of the coil frame.

Based on the forming device, an embodiment of the disclosure provides a manufacturing method of a titanium bipolar plate for a fuel cell, which may be operated according to the following steps.

Step 1 of assembling a device: referring to FIG. 4, a first deceleration block 8-1, a second deceleration block 8-2, and a mold 6 are all disposed inside a workpiece support block 3; the first deceleration block 8-1 and the second deceleration block 8-2 are disposed on two sides of the mold 6; and the first workpiece and the second workpiece are assembled and disposed on top of the workpiece support block 3. The assembled workpiece and workpiece support block 3 are disposed inside the coil frame. The workpiece support block 3 and the first workpiece 4 maintain good electrical contact under the action of a shank 9 and a coil frame 1, as shown in FIG. 5, which is a longitudinal sectional view corresponding to the cross-sectional view of FIG. 4. The mold 6 is disposed inside a loop composed of the first workpiece 4 and the workpiece support block 3. The final assembly diagram is shown in FIG. 4. The first workpiece adopts an AA1050 aluminum alloy with a thickness of 0.5 mm and the second workpiece adopts a titanium plate with a thickness of 0.1 mm. The workpiece support block 3 is H62 brass with width greater than the width of the workpiece. The mold 6 is a zirconia ceramic mold or stainless steel mold customized according to the required topography of the bipolar plate. The entire device is disposed in a vacuum environment.

Step 2 of connecting a circuit: after the assembly is completed, a capacitor as shown in FIG. 4 is adopted, R0 and L0 are respectively coil resistance and line inductance, and S is a switch. The switch S is closed to discharge the forming coil, the capacitance of a capacitor C is 50 uF to 160 uF, and the discharge voltage of the capacitor is adjustable from 0 V to 25 kV. During the discharge process, the closed induced current loop formed by the workpiece support block 3 and the first workpiece under the action of the magnetic field of the forming coil 2 induces a circular current. Under the combined action of the magnetic field and the induced current, the first workpiece is subjected to an electromagnetic force and plastic deformation occurs. At the same time, the electromagnetic force between the first workpiece and the workpiece support block enables the two to press against each other, which may provide an electromagnetic side-press force for the first workpiece.

Figure 6:
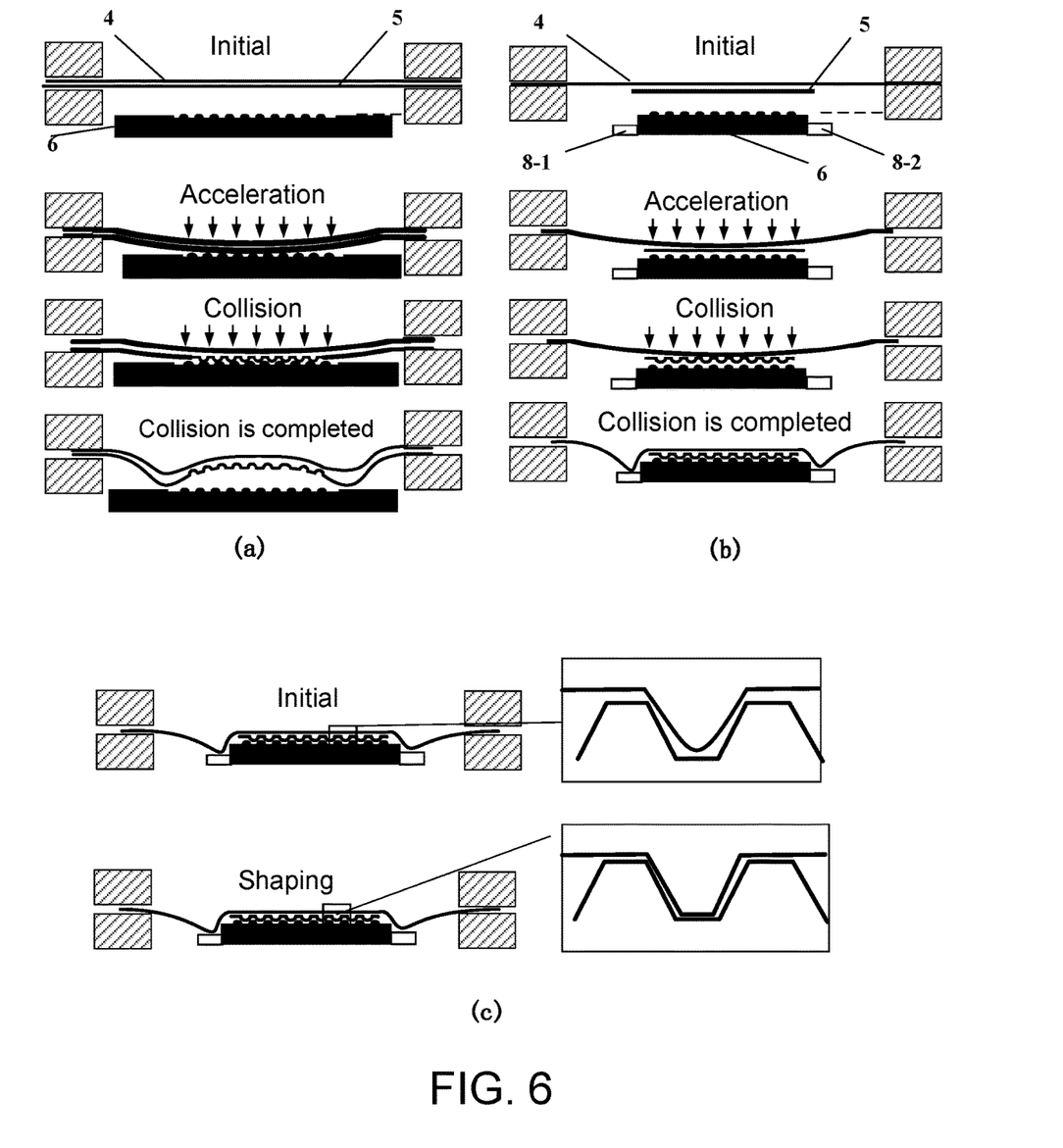
FIG. 6 is a schematic diagram of a forming process of the mesoscale plate, wherein (a) of FIG. 6 is a schematic diagram of wrinkles and rebound during a traditional forming process; (b) of FIG. 6 is a schematic diagram showing that the wrinkles and rebound are greatly reduced during the forming process of the workpiece according to a forming method in the disclosure; and (c) of FIG. 6 is a schematic diagram of shaping of the workpiece in the disclosure.

As shown in (a) of FIG. 6, in the traditional forming process, under the condition of equal length of the first workpiece and the second workpiece, the various portions of the first workpiece are not subjected to a uniform speed, resulting in a larger depth deviation of the flow channel of the titanium plate after forming. At the same time, after the first workpiece collides with the mold and decelerates, the speed of a middle area is reversed, causing serious rebound and wrinkles of the second workpiece and the first workpiece.

As shown in (b) of FIG. 6, in the disclosure, the middle area of the first workpiece and the second workpiece first collide with the mold, and the second workpiece inherits the uniform speed of the first workpiece. The shapes of the second workpiece and the first workpiece are restrained through the mold. An area close to the two ends of the first workpiece are still moving downward because the height of the deceleration block is less than the height of the mold, so that the middle area of the first workpiece and the second workpiece are completely flat and fit the mold, thereby reducing the wrinkles and rebound of the first workpiece and the second workpiece.

Step 3: As shown in (c) of FIG. 4, the mold and the second workpiece and the first workpiece fitted thereto move as a whole, and is fitted to the inner wall of the coil frame. The pulse supply is controlled to discharge the forming coil. The second workpiece and the first workpiece generate an electromagnetic force to tend further toward the mold, so as to complete shaping of the workpiece. The discharge during the process may be repeated until the mold is completely fitted, thereby obtaining a metal bipolar plate that satisfies requirements. Further preferably, a layer of soft insulating material, such as polyurethane, may be disposed between the first workpiece and the coil frame, so that the second workpiece and the first workpiece may be tightly fitted to the mold during the shaping process.

The disclosure applies pressure to the workpiece support block to drive the first workpiece to tend toward the inner wall of the coil frame, which cleverly solves the issue of side-pressing the workpiece in a narrow space inside the coil frame. At the same time, through the integral movement of the mold and the workpiece fitted thereto, the mold is fitted to the inner wall of the coil frame under the external pressure condition, which may avoid positional offset of the flow channel caused by secondary tooling. At the same time, the workpiece support block still maintains electrical contact with the first workpiece for the workpiece to obtain a uniform electromagnetic force. In addition, through reasonably controlling the spacing between the mold and the first workpiece, the uniform speed distribution area in the middle area of the first workpiece completely covers the mold area and first collides with the mold to restrain the shape of the first workpiece, which helps reduce the deviation of the flow path in the bipolar plate. When the area of the workpiece close to the ends of the mold continues to move downward until the speed is zero, it may ensure that the portion of the workpiece in contact with the mold is flattened and fully fits the mold, which reduces the wrinkles and rebound of the workpiece, and improves the flatness of the workpiece.

A third embodiment of the disclosure provides a heating manufacturing method of a stainless steel mesoscale plate. The difference between this embodiment and the second embodiment is that the assembly process is still the same as the first embodiment, but the discharge process is different from the second embodiment. The first workpiece is replaced with a 0.05 mm stainless steel plate, and the second workpiece is not included. Through reasonably controlling the discharge voltage of the capacitor and the impedance of the circuit or the forming coil, the temperature of the workpiece is heated to a temperature range of 200° to 900° through the current of the workpiece at the moment of collision and the workpiece may collide with the mold at a speed greater than 50 m/s. Then, the workpiece immediately collides with the mold, and then cools down. At this time, the plasticity of the stainless steel plate is greatly improved due to the temperature rise, which greatly improves the depth of the flow channel of the workpiece and the uniformity of the workpiece.

A fourth embodiment of the disclosure provides an integrated manufacturing method for embossing and blanking a large metal plate. The difference between this embodiment and the second embodiment is that the workpiece is replaced with a large plate with a size of 300*300*0.1 mm. The deceleration block and the mold form a stainless steel mold as a whole. The two ends of the mold are less than the height of the forming area. The forming area of the mold is embossed, and a blanking portion have corresponding holes. Blanking and embossing may be simultaneously implemented in one discharge. The assembly process is still the same as the first embodiment, but the forming coil is made differently from the specific second embodiment. As shown in FIG. 5, the forming coil is composed of 4 spiral coils connected in parallel. The strength of the forming coil is improved through partitions between the four spiral coils. In this way, the impedance of the forming coil will be significantly reduced, which avoids the significant increase in the impedance of the coil due to the increase in the size of the coil as the corresponding structure required for forming a large-sized plate. As such, the current peak value and frequency of the coil are increased, thereby increasing the electromagnetic force of the workpiece.

The fifth embodiment of the disclosure provides a manufacturing method of a stainless steel mesoscale plate. The difference between this embodiment and the second embodiment is that the first workpiece is disposed outside the coil frame. The corresponding second workpiece, mold, side-press device, workpiece support block, and deceleration block are also located outside the forming coil. The side-press device directly acts on the first workpiece to maintain electrical contact with the workpiece support block and form an induced current loop. The forming process is the same as the second embodiment.

Persons skilled in the art may easily understand that the above are only the preferred embodiments of the disclosure and are not intended to limit the disclosure. Any modification, equivalent replacement, improvement, etc. made within the spirit and principle of the disclosure should be included in the protection scope of the disclosure.

What is claimed is:

1. An electromagnetic manufacturing method of a mesoscale plate, comprising a forming step and a shaping step, wherein the forming step specifically comprises:
   Step (1) of oppositely disposing a first workpiece to be formed to a mold with a spacing between the first workpiece and the mold, side-press restraining two ends of the first workpiece, and disposing a deceleration block on two sides of the mold, wherein a height of the deceleration block is less than a height of the mold, wherein the first workpiece is separated from the mold;
   Step (2) of controlling a uniform electromagnetic force to drive the first workpiece so that the first workpiece is accelerated and moves toward the mold, and the first workpiece is deformed after colliding with the mold; and
   Step (3) of colliding a middle area of the first workpiece firstly with the mold under the drive of the uniform electromagnetic force, moving an area of the two ends of the first workpiece toward a direction of the mold, driving the middle area of the first workpiece to decelerate to zero, and completing forming when the area of the two ends collides with the deceleration block and decelerates until a speed of all areas of the first workpiece is zero; and
   the shaping step specifically comprises:
   Step (4) of controlling the first workpiece to tend further toward the mold under a drive of an electromagnetic force, and proceeding to Step (5); and
   Step (5) of determining whether the first workpiece completely fits the mold, wherein if yes, shaping of the first workpiece is completed to form the mesoscale plate, and if not, return to Step (4).

2. The electromagnetic manufacturing method according to claim 1, wherein through adjusting the spacing, the middle area of the first workpiece completely covers a forming area of the mold at a moment of collision with the mold, and a size of the spacing is negatively related to a size of the middle area of the first workpiece.

3. The electromagnetic manufacturing method according to claim 1, wherein the first workpiece is a conductive material, the first workpiece induces an electric current in a changing magnetic field, the electromagnetic force is generated by a combined action of the magnetic field and the electric current, and the electric current enables the first workpiece to collide with the mold at a temperature when Joule heat is generated.

4. The electromagnetic manufacturing method according to claim 1, comprising: disposing a second workpiece to be formed in the middle area of the first workpiece and fitting the second workpiece to the first workpiece; and controlling the uniform electromagnetic force to drive the first workpiece so that the first workpiece tends to the mold and the second workpiece colliding with the mold, and restraining a topography of the second workpiece through the mold, wherein
   a length of the second workpiece is less than a length of the first workpiece, and the second workpiece inherits a uniform speed middle area of the first workpiece.

5. The electromagnetic manufacturing method according to claim 4, wherein the second workpiece flows toward a bottom of the mold through disposing an electrical insulating layer between the first workpiece and the second workpiece.

6. A mesoscale plate manufactured by the electromagnetic manufacturing method according to claim 1.

7. A proton exchange membrane fuel cell including the mesoscale plate according to claim 6.

8. An electromagnetic forming device of a mesoscale plate, comprising a coil frame, a forming coil, a side-press device, a workpiece support block, a mold, a pulse supply, a first deceleration block, and a second deceleration block, wherein
   the forming coil is wound onto the coil frame to generate a uniform electromagnetic force after the forming coil is energized;
   the pulse supply is connected to the forming coil and is used to provide a power supply to the forming coil;
   the side-press device is used to provide a side-press force for a first workpiece to be formed;
   the workpiece support block is maintained in contact with the first workpiece to be formed under an external pressure provided by the side-press device and is disposed inside the coil frame; and
   the first deceleration block and the second deceleration block are respectively disposed at two ends of the mold, heights of the first deceleration block and the second deceleration block are less than a height of the mold, and the first deceleration block and the second deceleration block are used to provide a buffer to an area close to two ends of the first workpiece,
   wherein the forming coil surrounds the first workpiece.

9. The electromagnetic forming device according to claim 8, wherein the first workpiece to be formed is oppositely disposed to the mold, the two ends of the first workpiece are restrained through the side-press device, and control the uniform electromagnetic force to drive the first workpiece to moved toward the mold; under the drive of the uniform electromagnetic force, a middle area of the first workpiece first collides with the mold, the area close to the two ends of the first workpiece moving toward a direction of the mold, and the middle area of the first workpiece is driven to decelerate to zero, after the area close to the two ends collides with the first deceleration block and the second deceleration block, and until a speed of all areas of the first workpiece decelerates to zero, forming is completed; and a lengthened portion of the first workpiece due to plastic deformation is restrained above the first deceleration block and the second deceleration block to ensure that a portion of the first workpiece in contact with the mold is flattened and completely fits the mold, which reduces wrinkles and rebound of the workpiece, and improves flatness of the workpiece.

10. The electromagnetic forming device according to claim 8, wherein when the electromagnetic forming device forms a conductivity metal, a second workpiece is fitted to the middle area of the first workpiece, a length of the second workpiece is less than a length of the first workpiece, and the second workpiece inherits a uniform speed middle area of the first workpiece.

11. The electromagnetic forming device according to claim 8, wherein the side-press device is located outside the orthographic projection of the forming coil to the workpiece support block.

12. The electromagnetic forming device according to claim 8, wherein the forming coil is a multi-turn spiral coil wound by a single wire or a plurality of multi-turn spiral coils wound in parallel by a plurality of wires, and two ends of the plurality of wires adopt connectors to maintain electrical contact and implement electrical parallel connection.

13. The electromagnetic forming device according to claim 8, wherein a width of the workpiece support block is greater than the width of the forming coil, and the workpiece support block is a conductor or an insulating material.

14. The electromagnetic forming device according to claim 8, wherein the workpiece support block is subjected to pressure to drive the first workpiece to tend toward an inner wall of the coil frame.

15. The electromagnetic forming device according to claim 8 is designed according to a topography required by the first workpiece, which specifically has an arbitrary curved surface shape, such as a wavy, concave, or convex shape, to restrain a shape of the first workpiece; or is an arbitrarily shaped concave or convex groove to implement plate blanking.

* * * * *